United States Patent [19]

Kankkunen

[11] Patent Number: 5,656,781
[45] Date of Patent: Aug. 12, 1997

[54] CAPACITIVE PRESSURE TRANSDUCER STRUCTURE WITH A SEALED VACUUM CHAMBER FORMED BY TWO BONDED SILICON WAFERS

[75] Inventor: Tarja Kankkunen, Espoo, Finland

[73] Assignee: Vaisala Oy, Helsinki, Finland

[21] Appl. No.: 641,264

[22] Filed: Apr. 30, 1996

Related U.S. Application Data

[63] Continuation of Ser. No. 268,114, Jul. 6, 1994, abandoned.

[30] Foreign Application Priority Data

Jul. 7, 1993 [FI] Finland .................. 933124

[51] Int. Cl.⁶ .................................. G01L 9/12
[52] U.S. Cl. .................. 73/724; 73/718; 361/283.4
[58] Field of Search .................. 73/718, 724; 361/283.4

[56] References Cited

U.S. PATENT DOCUMENTS

| | | |
|---|---|---|
| 3,288,656 | 11/1966 | Nakamura . |
| 3,397,278 | 8/1968 | Pomerantz . |
| 4,257,274 | 3/1981 | Shimada et al. . |
| 4,332,000 | 5/1982 | Petersen . |
| 4,386,453 | 6/1983 | Giachino et al. . |
| 4,390,925 | 6/1983 | Freud . |
| 4,589,054 | 5/1986 | Kuisma . |
| 4,594,639 | 6/1986 | Kuisma . |
| 4,625,561 | 12/1986 | Mikkor . |
| 4,628,403 | 12/1986 | Kuisma . |
| 4,951,174 | 8/1990 | Grantham et al. ........... 73/718 X |
| 5,349,492 | 9/1994 | Kimura et al. ........... 73/724 X |

FOREIGN PATENT DOCUMENTS

| | | | |
|---|---|---|---|
| 4115420 | 11/1992 | Germany | ................. 73/724 |

*Primary Examiner*—George M. Dombroske
*Assistant Examiner*—Joseph L. Felber
*Attorney, Agent, or Firm*—Birch, Stewart, Kolasch & Birch, LLP

[57] ABSTRACT

A capacitive pressure transducer structure and a method for manufacturing the same comprises a transducer structure having a contiguous diaphragm structure (2), which at least in some parts is conducting to the end of forming a first electrode (4) of a transducing capacitor, a substrate (3) which is permanently bonded to a first surface of the diaphragm structure (2) and comprises a second electrode (5) of the transducing capacitor, spaced at a distance from and aligned essentially at the first electrode (4), and a silicon structure (1), which is permanently bonded to a second surface of the diaphragm structure (2), incorporating a space (21) suited to accommodate the deflection of the first electrode (4). The angle α formed between vertical walls (11) of the space (21) and the first electrode (4) is smaller than or equal to 90°, and the material surrounding the space (21) is silicon or doped silicon.

7 Claims, 3 Drawing Sheets

CAPACITIVE PRESSURE TRANSDUCER STRUCTURE WITH A SEALED VACUUM CHAMBER FORMED BY TWO BONDED SILICON WAFERS

This application is a continuation of application Ser. No. 08/268,114 filed on Jul. 6, 1994, now abandoned.

FIELD OF THE INVENTION

The present invention relates to a capacitive pressure transducer structure with a contiguous diaphragm structure, a substrate permanently bonded to a first surface of the diaphragm structure and a silicon structure permanently bonded to a second surface of the diaphragm structure. Some parts of the diaphragm structure conducting to the end of a first electrode of a transducing capacitor. The substrate on the first surface comprising a second electrode of the transducing capacitor, spaced at a distance from and aligned essentially at the first electrode. The silicon structure incorporates a space suited to accommodate deflection of the first electrode.

The invention also concerns a method for manufacturing said capacitive pressure transducer structure.

DESCRIPTION OF THE BACKGROUND ART

With regard to the prior art, reference is made to the following publications:

U.S. patents
1 U.S. Pat. No. 4,386,453 (Gianchino et al.)
2 U.S. Pat. No. 4,257,274 (Shimada et al.)
3 U.S. Pat. No. 4,332,000 (Petersen)
4 U.S. Pat. No. 4,390,925 (Freud)
5 U.S. Pat. No. 3,397,278 (Pomeranz)
6 U.S. Pat. No. 4,589,054 (Kuisma)
7 U.S. Pat. No. 4,628,403 (Kuisma)
9 U.S. Pat. No. 4,594,639 (Kuisma)
9 U.S. Pat. No. 3,288,656 (Nakamura)

Cited publications 1–5 are related to a capacitive pressure transducer structure in which a silicon diaphragm acting as a moving first electrode flexes toward a second, fixed metal electrode so as to permit the electrodes to approach each other with increasing pressure. The distance between the electrodes is a function of the imposed pressure. Cited publications 6, 7 and 8 disclose a capacitive pressure transducer structure in which the silicon diaphragm acting as the first electrode flexes away from the fixed metal electrode with increasing pressure. Cited publication 9 describes for the first time in the art a method for interbonding two silicon wafers using a technique called fusion bonding.

Prior-art capacitive pressure transducer structures based on arranging the electrodes to be closest to each other at the lowest pressure are disclosed in cited publications 6, 7 and 8. Such a pressure transducer structure has a very wide operating pressure range. The capacitance rate-of-change with respect to pressure in the transducer structure is highest at low pressures when the electrodes are very close to each other, thus making the pressure measurement extremely accurate also at low pressures. Owing to the use of a vacuum chamber in the structure, no through holes for the conductors are required which helps attaining a stable vacuum. The vacuum chamber is sealed by a glass plate or silicon wafer coated with a glass layer. The first electrode of the transducer capacitor is thus formed by the smaller-area end of the conical vacuum chamber. Consequently, the conical vacuum chamber widens outwardly from the transducer diaphragm.

Disadvantages of the prior-art technology structures are:
1. Owing to the different coefficients of thermal expansion in silicon and glass, the flexible diaphragm is subjected to stresses which result in a substantial temperature dependence of the transducer.
2. Residual gases in the vacuum chamber cause long-term instability.
3. Transducer size has been excessively large for a low-cost volume product. The number of transducers per processed wafer has been too small.
4. The transducer structures have been excessively complicated requiring the use of several lithography processes. To improve the yield in the manufacturing process of the transducer, its structure and manufacturing process should be the simplest possible.
5. As the diaphragm acting as the active transducer member is the smaller end of the conical vacuum chamber, the other end, the larger-area end has been the crucial factor increasing the area of the transducer element. In other words, when a certain design area has been selected for the transducer diaphragm, due to the limitations of the transducer technology employed, the size of the larger-area end of the vacuum chamber has caused a drastic reduction in the number of transducers fitting on a wafer.

SUMMARY OF THE INVENTION

It is an object of the present invention to overcome the disadvantages of the above-described prior-art technology and to achieve an entirely novel type of capacitive pressure transducer structure and a method for manufacturing the same.

The invention is based on:
1) sealing the vacuum chamber of the transducer structure by fusion bonding two silicon wafers together, and
2) thinning the silicon water intended to form the flexible silicon diaphragm subsequent to the sealing of the vacuum chamber.

More specifically, the capacitive pressure transducer according to the invention is characterized by a thick wafer having vertical walls defining a space with an angle $\alpha$ formed between vertical walls of the space and the first electrode being smaller than or equal to 90° and the material surrounding the space being silicon or doped silicon.

Furthermore, the method according to the invention is characterized by a method wherein over the space formed in the silicon structure, a diaphragm structure is formed in essentially vacuum conditions using fusion bonding techniques. The diaphragm is thinned by micromechanical methods to the end forming the first electrode and the silicon structure now incorporating the first electrode is attached to a substrate incorporating the second electrode.

The invention offers significant benefits.

The manufacturing process and structure of the transducer are extremely uncomplicated. The transducer structure has a very small size and low manufacturing cost. The transducer provides a wide operating range. Minimization of the transducer size achieves the lowest possible cost of the transducer structure. Owing to the simple manufacturing process, a high yield and minimized manufacturing costs are attained.

The benefits of the invention include the possibility of maximizing the vacuum chamber volume, while the transducer area is simultaneously retained as small as possible. As known, residual gases in the vacuum chamber cause temperature dependence of the transducer zero point, which may be decreased by maximizing the vacuum chamber volume. For the first time in the art this invention discloses a transducer structure with a vacuum chamber construction is made from no other materials except silicon. As known, structures having the vacuum chamber sealed by glass are hampered by the fact that glass easily absorbs gases which may then be released into the vacuum chamber thus causing long-term instability of the transducer. The footprint of the present transducer structure is minimized, because the manufacturing process of the vacuum chamber wastes no wafer area in the slanted chamber walls as is the case with the prior-art structures discussed in above-noted patents 6 and 7.

A further benefit of the present invention is that a hermetic bond is attained in the silicon-silicon interface, whereby hermeticity can easily be assured using prior-art surface treatments in a conventional manner as discussed in the above-mentioned patent 9. The anodic bonding of the glass-silicon interface in the present structure is not subject to the hermeticity requirement. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is next examined in greater detail with the help of exemplifying embodiments illustrated in the appended drawings which are given by way of illustration only, and thus are not limitative of the present invention, and in which.

DETAILED DESCRIPTION OF THE PREFERRED EMBODIMENTS

With reference to FIGS. 1, 2, 3 and 4, exemplifying embodiments of pressure transducer structures according to the present invention are illustrated having a design in which the silicon diaphragm is flexed away from the fixed metal electrode with increasing pressure and having the vacuum chamber sealed with a silicon wafer. The manufactured transducer structures are illustrated as separate transducers. In the actual manufacturing process, however, the transducers are made as an array on circular wafers from which the individual transducers are separated by sawing. In a preferred embodiment of the invention, the vacuum chamber is made into silicon using conventional micromechanical techniques starting from a thicker silicon wafer and then sealing the chamber by a thinner silicon wafer which is subjected to further thinning after the silicon wafers are bonded. Such a manufacturing method according to the invention is illustrated in FIGS. 6a–6g.

Figure 1:
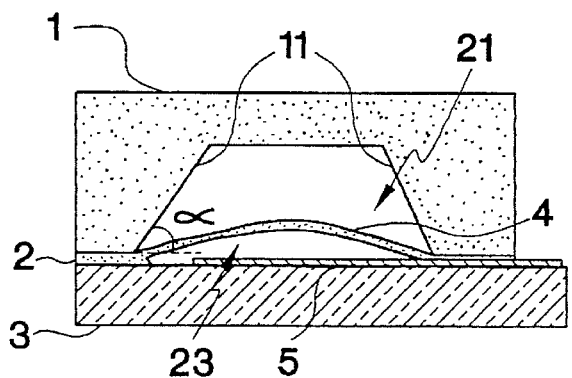
FIG. 1 is a side view of an embodiment of the capacitive pressure transducer according to the invention.

With reference to FIG. 1, the transducer embodiment shown herein is made by first using conventional micromechanical techniques to work into a thick silicon wafer 1 a vacuum chamber or deflection space 21 having slanted walls 11 which, however, do not consume extra silicon footprint which would be detrimental to the goal of attaining a small physical size of the transducer. In accordance with the invention, the angle α formed between the wall 11 and a diaphragm 4 formed into the thin silicon wafer 2 so as to act as the moving electrode of the transducing capacitor is smaller than or equal to 90°. The angle α is defined as the angle formed when the diaphragm 4 is not subjected to external pressure. The width of the vacuum chamber 21 determines the width of the flexible diaphragm 4 which is one of the transducer's key dimensions in a given application. To the thicker wafer 1 into which the vacuum chamber 21 is formed, a thin silicon wafer 2 is hermetically attached by fusion bonding. Prior to bonding, the flat silicon surfaces are treated by conventional silicon surface wash processes, after which the wafers are superimposed in a vacuum and the bond is sealed by a heat treatment. In FIG. 1 the thinned silicon wafer 2 forms both the flexible diaphragm 4 and the air gap 23 which determines the zero-point capacitance. The depth of the vacuum chamber 21 is limited by the thickness of the thicker silicon wafer which typically ranges from 500 μm to 1500 μm. The diaphragm 4 or at least its lower surface is doped conducting. To this end, the typical bulk doping level is $10^{18}$ impurity atoms/cm$^3$.

The thin flexed diaphragm 4 remains adhered to the thicker silicon wafer 1 during the entire thinning process of the diaphragm area, which is essential for attaining a high yield through keeping the diaphragm intact during the thinning process. While the thickness of the flexible diaphragm 4 must be known to determine the pressure sensitivity of the transducer, the measurement of the diaphragm thickness is impossible by conventional methods as the diaphragm 4 is an integral part of the thicker wafer. However, the deflection profile of the diaphragm 4 can be measured optically and then the diaphragm thickness can be computed from the measured deflection. The thinned, flat silicon surface is next furnished with a metal electrode 5 and a bonding pad 3 thereof by, e.g., anodic bonding, whereby a glass layer deposited on the silicon wafer provides isolation.

Figure 2:
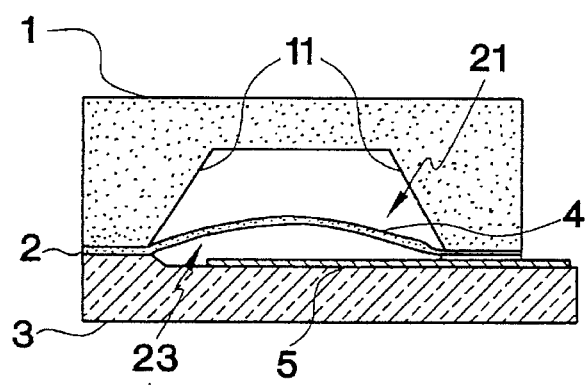
FIG. 2 is a side view of a second embodiment of the capacitive pressure transducer according to the invention.

With reference to FIG. 2, a transducer structure similar to that described above is illustrated with, however, the air gap 23 located differently from that shown in FIG. 1. The air gap 23 is here made in the glass layer 3, while in the structure shown in FIG. 1 it was made in the silicon of the wafer 2. The most critical dimension of the transducer is the depth of the air gap, and consequently, its processing in a homogenous glass layer is easier to control than for silicon in which the etching rate of silicon is influenced by, i.a., the resistivity of the silicon wafer.

Figure 3:
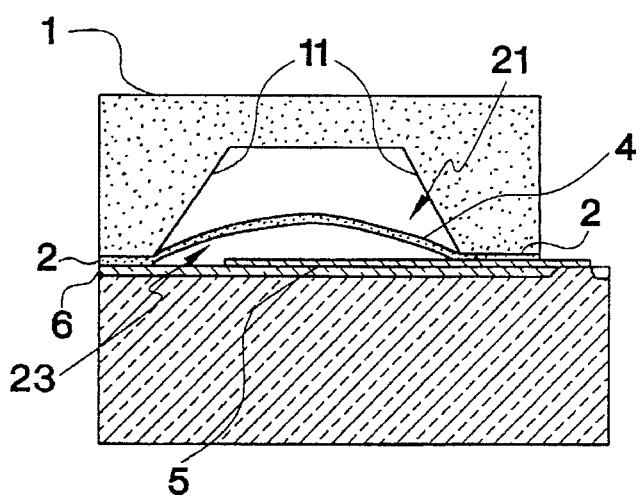
FIG. 3 is a side view of a third embodiment of the capacitive pressure transducer according to the invention.

With reference to FIG. 3, a transducer structure is shown in which the substrate for the metal electrode 5 is formed by a silicon wafer 3 having a thin glass layer 6 deposited on it in the manner described in cited reference 6. The air gap 23 is formed by etching in the silicon of the wafer 2.

Figure 4:
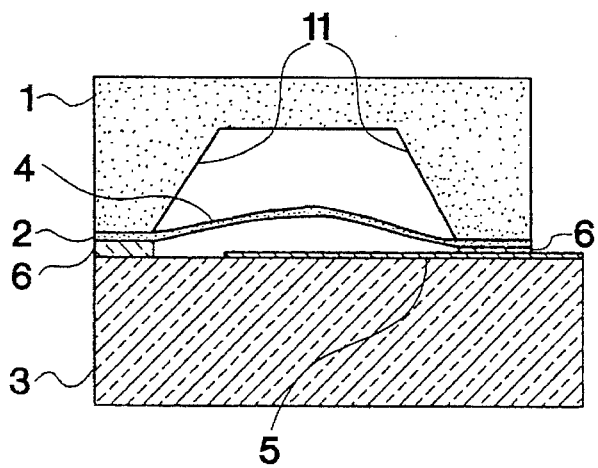
FIG. 4 is a side view of a fourth embodiment of the capacitive pressure transducer according to the invention.

With reference to FIG. 4, a transducer structure is shown in which the air gap and the dielectric isolation of the wafer 2 from the metal electrode 5 is provided by the thin glass layer 6. The section plane of the diagram is coincident with the communication channel of the external pressure.

Figure 5:
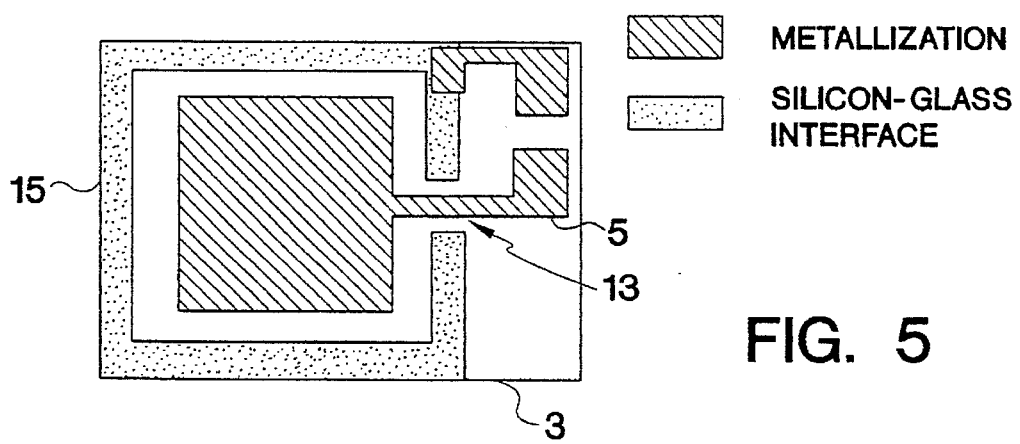
FIG. 5 is a top view of the silicon-glass interface in the structure illustrated in the diagram of FIG. 4.

With reference to FIG. 5, a transducer structure is shown in a top view illustrating the interface between the silicon wafer providing the substrate for the metal electrode 5 and the thinned silicon wafer. The silicon-glass interface is denoted by reference numeral 15. The communication channel 13 of the external pressure is formed at the metallization 5 of the other capacitor electrode.

With reference to FIGS. 6a–6g, the transducer is manufactured comprising:

a) Processing a typically 500–1500 μm thick silicon wafer 1 by conventional lithography methods to comprise a vacuum chamber 21 of thickness 100–1000 μm. Silicon is etched by, e.g., 3–50% potassium hydroxide solution giving an etching rate of 0.5–1 μm/min typical. In a wafer of normal silicon, the walls of the chamber 23 are etched slanted so as to shape the chamber 23 into a truncated cone.

b–c) Attaching to the silicon wafer 1 with the vacuum chambers by fusion bonding another silicon wafer 2 of 200–400 μm thickness typical. Prior to the fusion bonding step, the silicon surfaces are treated by, e.g., hot nitric acid, RCA wash or $H_2SO_4/H_2O_2$ wash.

d–e) Thinning the silicon wafer 2 to an extremely thin thickness of 1–100 μm, typically 20 μm. The thinned wafer 2 remains during the entire thinning process attached to the thicker wafer. When desired, the wafer 2 can further be thinned at the vacuum chamber 21 to the end of forming an air gap under the transducing diaphragm 4 relative to the other electrode of the transducing capacitor.

f–g) Bonding both interbonded silicon wafers with the ready-processed flexible diaphragm 4 to a substrate 3 incorporating an isolated metal electrode 5 of the transducing capacitor.

Figure 7:
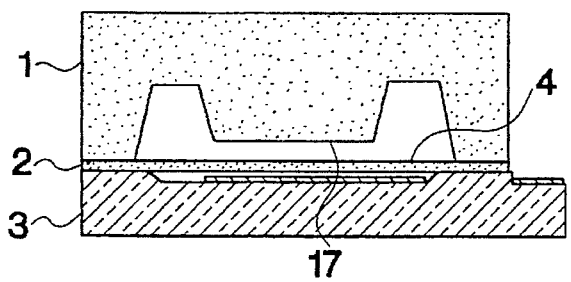
FIG. 7 is a side view of a capacitive pressure transducer according to the invention provided with overpressure protection.

With reference to FIG. 7, a transducer structure similar to that shown in FIG. 1 is illustrated with an overpressure protection 17. Such an overpressure protection 17 is formed by etching a part of the vacuum chamber bottom to a depth corresponding to the desired maximum permissible deflection of the diaphragm 4. Thus, the transducer can be made to stand also high overpressures during which the diaphragm is deflected against the overpressure protection 17 without rupturing.

Figure 8:
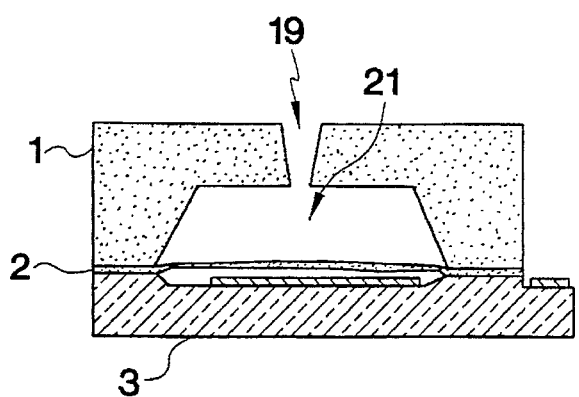
FIG. 8 is a side view of a capacitive differential pressure transducer according to the invention.
Figure 6A:
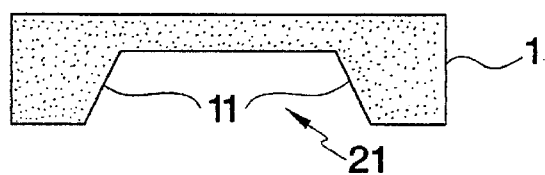
FIGS. 6a–6g are side views of the different steps of the manufacturing method according to the invention.
Figure 6B:
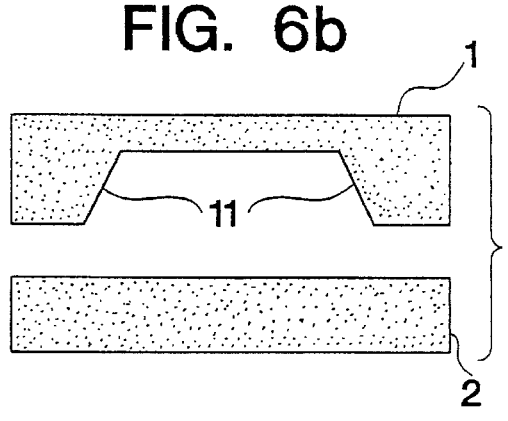
Figure 6C:
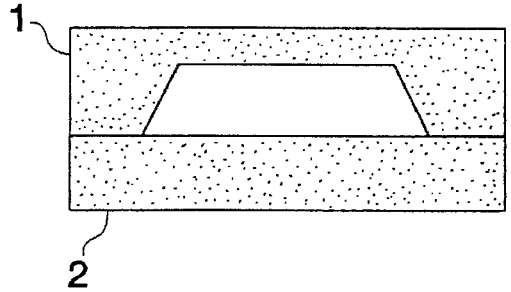
Figure 6D:
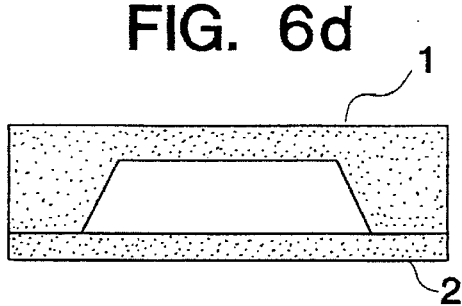
Figure 6E:
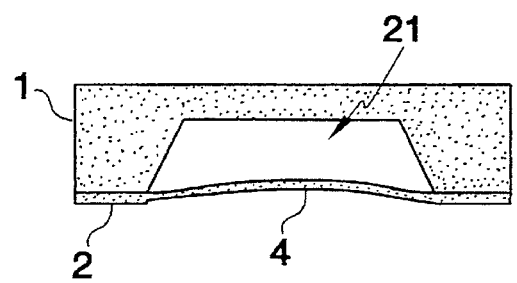
Figure 6F:
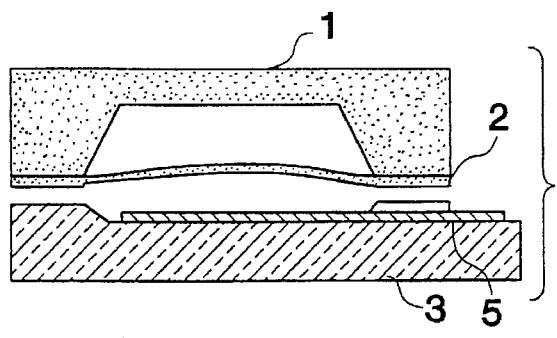
Figure 6G:
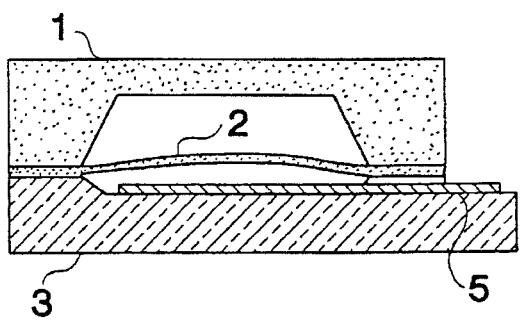

With reference to FIG. 8, a differential pressure transducer structure is shown having the chamber provided with a drilled or etched hole 19 to the end of permitting the chamber 23 to communicate with the external pressure.

Contacts to the transducing capacitor electrodes can also be furnished by virtue of contacts made through the glass substrate layer 3. Through holes for the contacts can be implemented either by mechanical or chemical processing steps. The through holes are made conducting by sputter deposition of a suitable metal in them to the end of forming the electrical contacts. Such an arrangement can be used to pack more transducers on a wafer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A capacitive pressure transducer structure comprising:

a contiguous diaphragm structure having a conducting portion, the diaphragm structure forming a first electrode of a transducing capacitor, the first electrode having a uniform thickness;

a substrate, which is permanently bonded to a first surface of said diaphragm structure, the substrate having a second electrode of said transducing capacitor, spaced at a distance from and aligned essentially at said first electrode, the distance between the second electrode and the first electrode forming an air gap, vertical walls of the substrate form sides of the air gap;

a silicon structure, which is permanently bonded to a second surface of said diaphragm structure, incorporating a deflection space for accommodating deflection of said first electrode, the deflection space being larger than the air gap, and a first angle α being formed between vertical walls of said silicon structure and said first electrode, the first angle α being smaller than or equal to 90°, and the first electrode being in direct contact with the vertical walls of the silicon structure, a second angle being formed between at least one vertical wall of the substrate and said first electrode, the second angle being less than 90°, wherein material surrounding said deflection space is silicon or doped silicon.

2. The capacitive pressure transducer structure as defined in claim 1, further comprising a projection for limiting the deflection of said first electrode, the projection being provided in the interior of said deflection space.

3. The capacitive pressure transducer structure as defined in claim 1, wherein said deflection space is a vacuum chamber.

4. The capacitive pressure transducer structure as defined in claim 1, wherein said deflection space is provided with a channel for communication with an external pressure.

5. The capacitive pressure transducer structure as defined in claim 1, wherein the diaphragm structure including the first electrode has a generally uniform thickness.

6. The capacitive pressure transducer structure as defined in claim 1, wherein the first electrode and a remaining portion of the diaphragm structure have a smooth, uninterrupted boundary therebetween whereby a notch is avoided at the boundary around the first electrode.

7. The capacitive pressure transducer structure as defined in claim 1, wherein the second angle is measured from areas of each respective vertical wall which areas are adjacent to the diaphragm structure.

* * * * *